United States Patent

Nakamura et al.

[11] Patent Number: 5,898,734
[45] Date of Patent: Apr. 27, 1999

[54] SYMBOL DETERMINING METHOD AND APPARATUS

[75] Inventors: Kiyofumi Nakamura, Yamanashi; Kinari Kaneda, Yokohama, both of Japan

[73] Assignee: Kokusai Electric Co., Ltd., Tokyo, Japan

[21] Appl. No.: 08/790,751

[22] Filed: Jan. 27, 1997

[30] Foreign Application Priority Data

Jan. 29, 1996 [JP] Japan ..................................... 8-034421

[51] Int. Cl.⁶ .............................. H04L 25/34; H04L 25/49
[52] U.S. Cl. .......................... 375/287; 375/317; 375/340; 375/264
[58] Field of Search ...................................... 375/317, 287, 375/340, 286, 316, 324, 293, 264; 341/56, 58; 370/509, 514

[56] References Cited

U.S. PATENT DOCUMENTS

| | | | |
|---|---|---|---|
| 5,425,056 | 6/1995 | Maroun et al. | 375/317 |
| 5,521,941 | 5/1996 | Wiatrowski | 375/287 |
| 5,670,951 | 9/1997 | Servilio | 340/825.44 |

FOREIGN PATENT DOCUMENTS 60-174550  9/1985  Japan .

*Primary Examiner*—Stephen Chin
*Assistant Examiner*—Betsy L. Deppe
*Attorney, Agent, or Firm*—Sixbey, Friedman, Leedom & Ferguson, P.C.; Gerald J. Ferguson, Jr.; Eric J. Robinson

[57] ABSTRACT

The level of a symbol information in a symbol-sync part transmitted for the purpose of synchronizing a receiver of a digital radio communications system reflects the state of the concurrent transmission. With this factor taken in account, a symbol determining method is provided which comprises the steps of receiving a symbol information extracted from a symbol-sync part of a received signal obtained by demodulating a received wave and digitizing it; generating thresholds for use to determine the value of the received symbol based on the reception level of the symbol information; determining the value of the received symbol in the data part of the received data based on the thresholds; and reproducing the symbol. Therefore, even if a received symbol is deteriorated due to a degradation, etc. of transmission line, a symbol determination can be done with no degradation of the signal reception due to a narrowing of noise margin, etc.

3 Claims, 7 Drawing Sheets

FIG.5

| Symbol No. | Symbol-information level | Threshold S1 | Threshold S2 | Threshold S3 |
|---|---|---|---|---|
| 1 | 11111111(2) | 00011111[111](2) | 00000000[00](2) | 00000000[00](2) |
| 2 | 00000000(2) | 00011111[111](2) | | |
| 3 | 11111101(2) | 00111111[100](2) | | |
| 4 | 00000001(2) | 00111111[101](2) | | |
| 5 | 11111110(2) | 01011111[101](2) | | |
| 6 | 00000010(2) | 01011111[101](2) | | |
| 7 | 11111110(2) | 01111111[011](2) | | |
| 8 | 00000000(2) | 01111111[011](2) → | | |
| 9 | 10101001(2) | | 00101010[01](2) | |
| 10 | 11111111(2) | | 01101010[00](2) | |
| 11 | 10101011(2) | | 10010100[11](2) | |
| 12 | 01010011(2) | | 11010011[11](2) → | 00010100[11](2) |
| 13 | 11111100(2) | | | 00010100[11](2) |
| 14 | 00000000(2) | | | 00101001[11](2) |
| 15 | 01010100(2) | | | 00101010[01](2) |
| 16 | 00000010(2) | | | |

(2) means a binary number
[ ] means discarding

T : Period of Symbol

SYMBOL DETERMINING METHOD AND APPARATUS

BACKGROUND OF THE INVENTION

1. Field of the Invention

The present invention relates to a method of determining the value of a received symbol obtained by demodulating a received digital modulated wave in a demodulator of a receiver used in a digital radio communications system to reproduce the symbol, and an apparatus destined for use in the demodulator of the receiver to carry out the method.

2. Description of the Prior Art

In the receivers such as a pager and the like used in conventional digital radio communications systems, the demodulator has a code reproducing circuit which compares with thresholds a received digital signal having been distorted over the transmission line to reproduce the digital signal. The conventional symbol determination apparatus to determine the value of a received symbol obtained through demodulation of the modulated wave of a received digital signal and reproduce the symbol, determines the symbol based on thresholds fixedly preset in the symbol determination apparatus. This will be explained with reference to a digital radio communications system utilizing a quaternary digital modulation, for example. This communications system may use four kinds of unit pulses or symbols as shown in FIG. 6. Signals formed from these four kinds of symbols, that is, symbols having values +1, +⅓, –1/3 and –1, respectively, will be transmitted over the communications system, and the signals received at a destination will result in eye patterns as shown in FIG. 7.

For the conventional determination of the above-mentioned value of such a signal having arrived (namely, received symbol), three kinds of thresholds, for example, +⅔, 0, –⅔, fixedly preset in a symbol determination apparatus are compared with the level of the received symbol as shown in FIG. 7. For example, when the level of the received symbol is larger than the threshold +⅔, the value of the received symbol is determined to be 1. When the level of the received symbol is smaller than the threshold 0 and larger than the threshold –⅔, the value of the symbol is determined to be –⅓ and the symbol is reproduced.

Assume here a conventional symbol determination apparatus designed to determine a symbol value through comparison of thresholds fixedly preset in the apparatus with the level of a received symbol. If a fading or a distortion due to a degradation of a transmission line in consideration causes a received symbol, namely, eye pattern, to be reduced in maximum amplitude as shown in FIG. 8, or if the eye pattern is deviated from a due one (shown in FIG. 7, for example) as shown in FIG. 9, the preset thresholds are not correctly applicable any longer for determination of the value of a received symbol, so that the noise margin is smaller, causing the signal reception to be degraded. In an extreme case, it is impossible to correctly determine the symbol whether or not the transmitted signal is affected by noises. The noises cause the symbol value to vary, resulting in the reduction in level of the symbol, so that the determination becomes erroneous.

A method of varying symbol is known from the disclosure in the Japanese Unexamined Patent Publication (Kokai) No. 60-174550. According to this disclosed invention, a mean value is taken from the levels of received symbols and a threshold is taken from the mean value to determine the value of a received symbol. With this prior-art technique, however, the symbol in a received data varies in level from one to another. A threshold derived by averaging the values of received symbols varying in level is not correctly applicable for determining the values of the received symbols. Also in this case, the noise margin is narrowed and the signal reception is degraded, so that no correct symbol determination is possible.

Accordingly, a symbol determination apparatus has so far been demanded which can be used to determine a received symbol with no degradation of signal reception due to a reduction of noise margin, etc. even if the received symbol is deteriorated due to a degradation of transmission line, etc.

SUMMARY OF THE INVENTION

It is an object of the present invention to provide a symbol determining method destined for use in a receiver of a digital radio communications system in which a frame of a transmitted signal has, besides a data part carrying a to-be-transmitted information, a symbol-sync part carrying a symbol information used for phase-matching between the transmitted signal and the receiver, comprising the steps of receiving a symbol information extracted from a symbol-sync part of a received signal obtained through demodulation and digitizing of a received wave; generating thresholds for use to determine the value of the received symbol based on the reception level of the symbol information; and determining the value of the received symbol in the data part of the received data based on the thresholds.

It is another object of the present invention to provide a symbol determination apparatus destined for use in a receiver of a digital radio communications system in which a frame of a transmitted signal has, besides a data part carrying a to-be-transmitted information, a symbol-sync part carrying a symbol information used for phase-matching between the transmitted signal and the receiver, comprising symbol information extracting means for extracting a symbol information of the symbol-sync part from a received data obtained through demodulation and digitizing of the received wave, and delivering the extracted symbol information; threshold generating means for receiving the symbol information delivered from the symbol information extracting means, generating thresholds for use to determine the value of the received symbol based on the reception level of the symbol information, and delivering the thresholds thus generated; symbol determining means for receiving the received data and the thresholds from the threshold generating means, determining the value of the received symbol in the data part of the received data, and reproducing the symbol; and controlling means for receiving the received data, delivering, based on the received data, an activation timing control signal to each of the symbol information extracting means, threshold generating means and symbol determining means and thus controlling the object means.

Further, the above-mentioned threshold generating means comprises a first averaging unit which is activated with a first control signal supplied from the controller to add together an input symbol information and a data returned from an output terminal thereof via a data bus and provide a first threshold, a second averaging unit which is activated when the first control signal is not supplied any longer and when supplied with a second control signal from the controller, to compare an input symbol information with the first threshold, add together the input symbol information and a data returned from an output terminal thereof via a data bus when the symbol information is larger, and provide a second threshold, a third averaging unit which is activated with a third control signal supplied from the controller simultaneously with the second control signal from the controller to compare an input symbol information with the first threshold, add together the input symbol information and a data returned from an output terminal thereof via a data bus when the symbol information is smaller, and provide a third threshold.

The above-mentioned generation of thresholds permits to always provide an optimum threshold even if the state of transmission line is degraded, thereby assuring a correct value determination of a received symbol.

These and other objects and advantages of the present invention will be better understood from the ensuing description made, by way of example, of the preferred embodiment of the present invention with reference to the drawings.

BRIEF DESCRIPTION OF THE DRAWINGS

FIG. 5 shows the threshold generating process with changes of a binary number;

DETAILED DESCRIPTION OF THE PREFERRED EMBODIMENT

Figure 6:
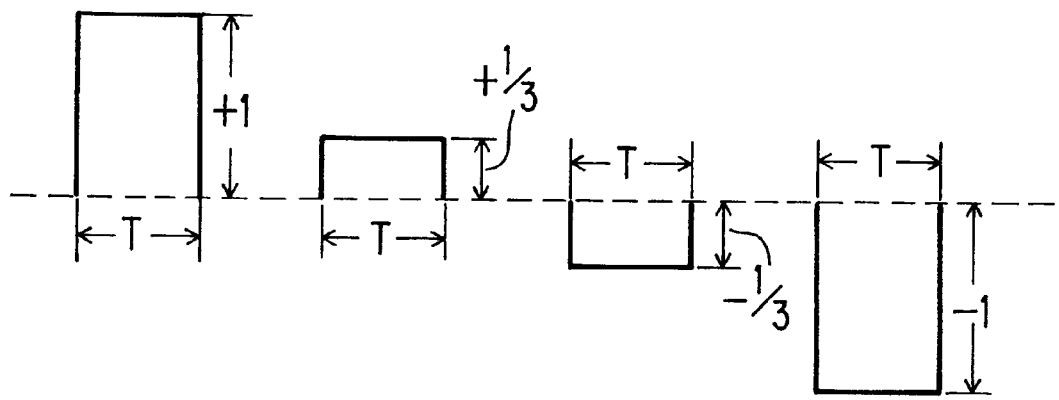
FIG. 6 shows four kinds of conventional symbols.
Figure 7:
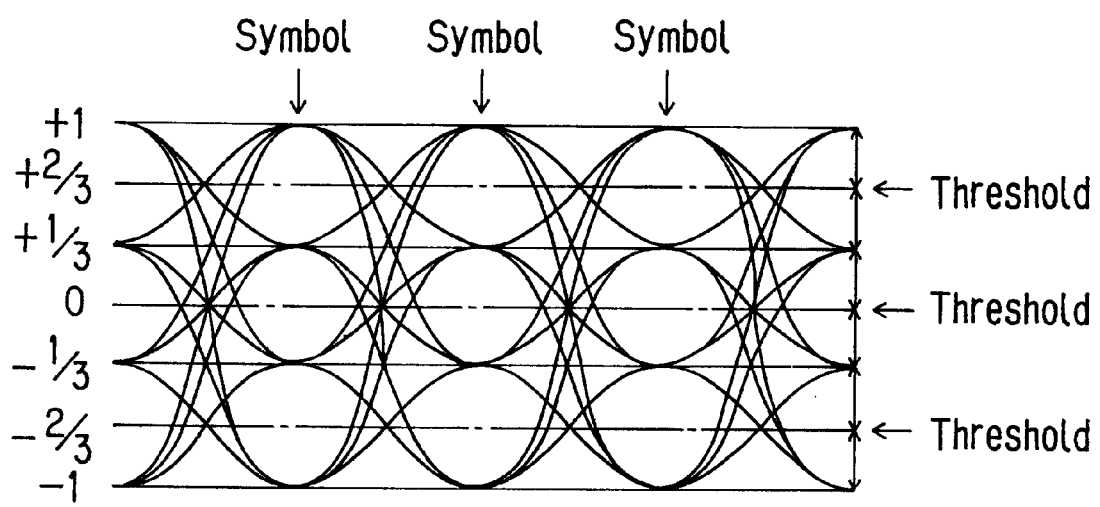
FIG. 7 shows eye patterns of received symbols.
Figure 8:
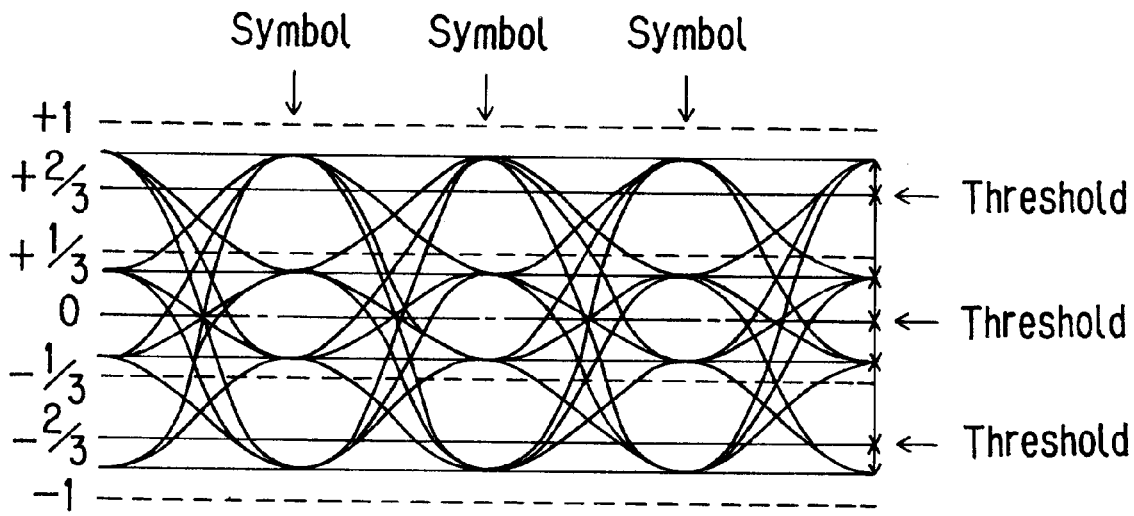
FIG. 8 shows eye patterns with an error.
Figure 9:
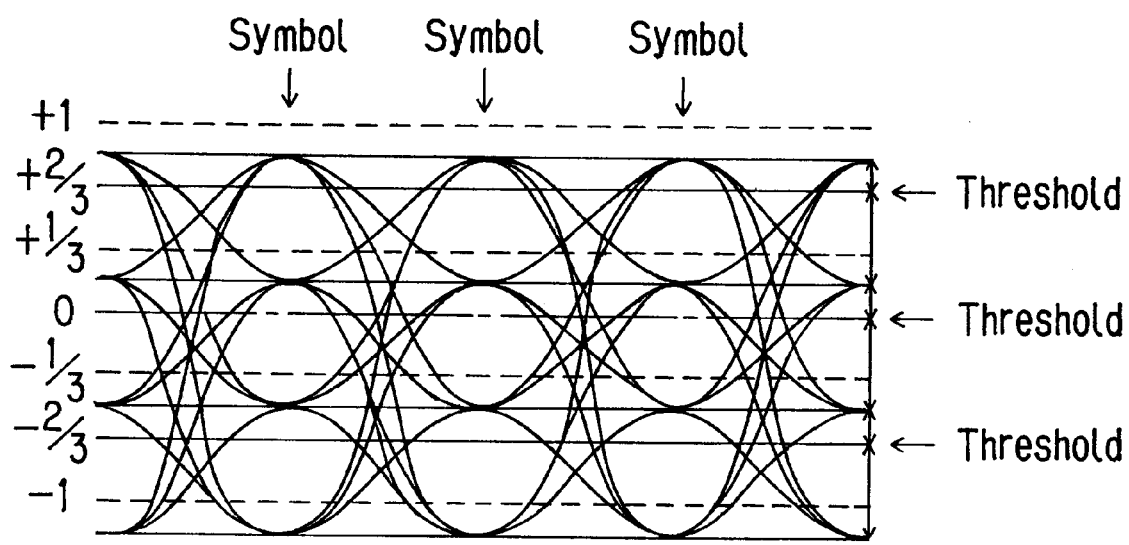
FIG. 9 shows eye patterns with an error.

Note that the embodiment of the present invention is destined for use in a receiver of a radio communications system utilizing the quaternary digital modulation and that the four values are represented by four kinds of pulses, namely, symbols, respectively, as shown in FIG. 6. The receiver receives a signal modulated with the four kinds of symbols, demodulates it into received symbols, digitizes the symbols and determines the digitized symbols. For the digitization, each of the received symbols is represented by an 8-bit binary number, for example. In this case, the level of a received symbol having a value +1 during an ideal transmission is represented by 11111111 (namely, decimal number 255), and the level of a received symbol having a value −1 during the same transmission is by 00000000 (namely, decimal number 0). The levels of these binary numbers are taken as references, and a received symbol to be determined is represented by an 8-bit binary number corresponding to its level.

Figure 1:
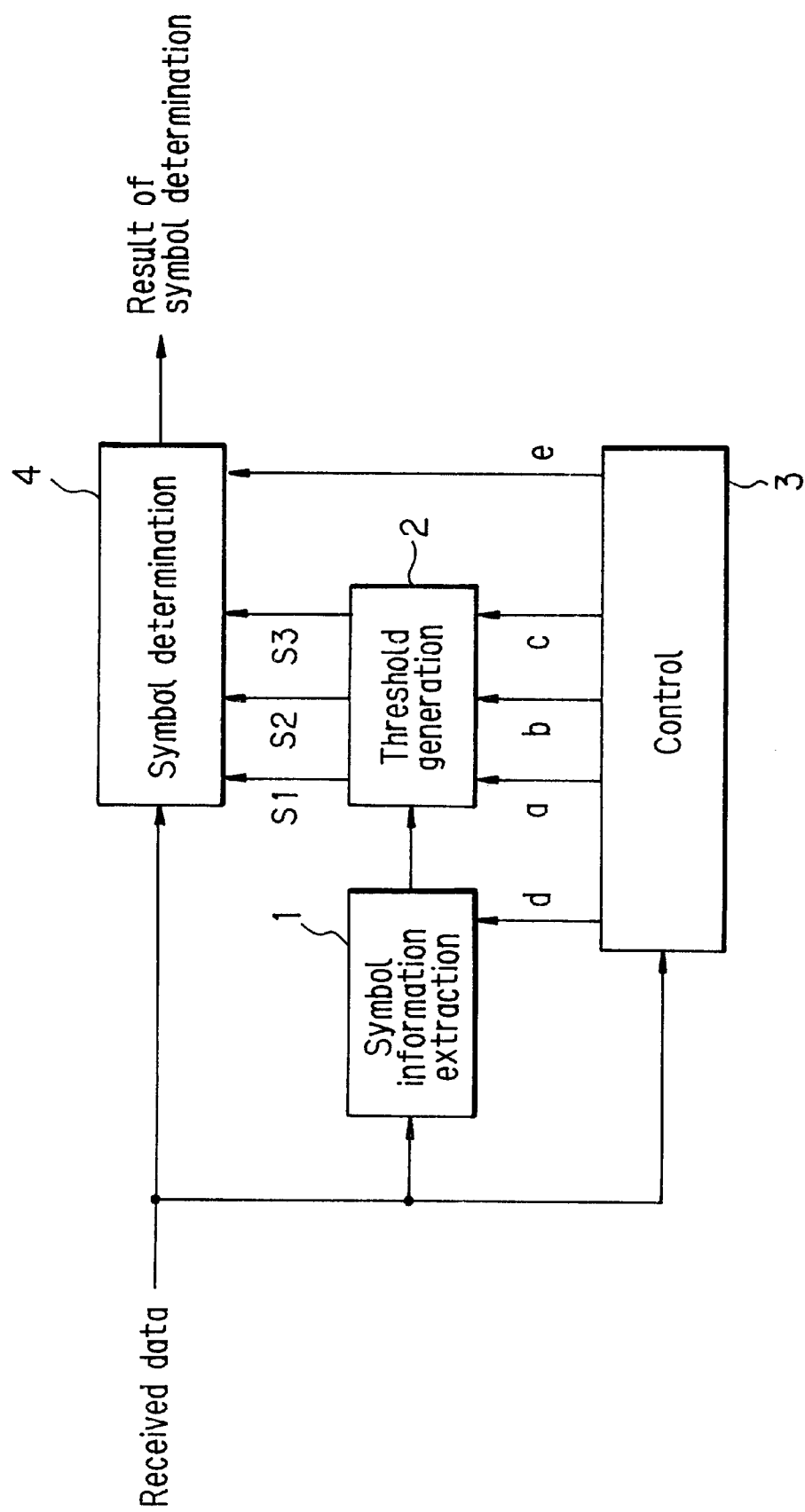
FIG. 1 is a block diagram of the circuit configuration of an embodiment of the present invention.
Figure 2:
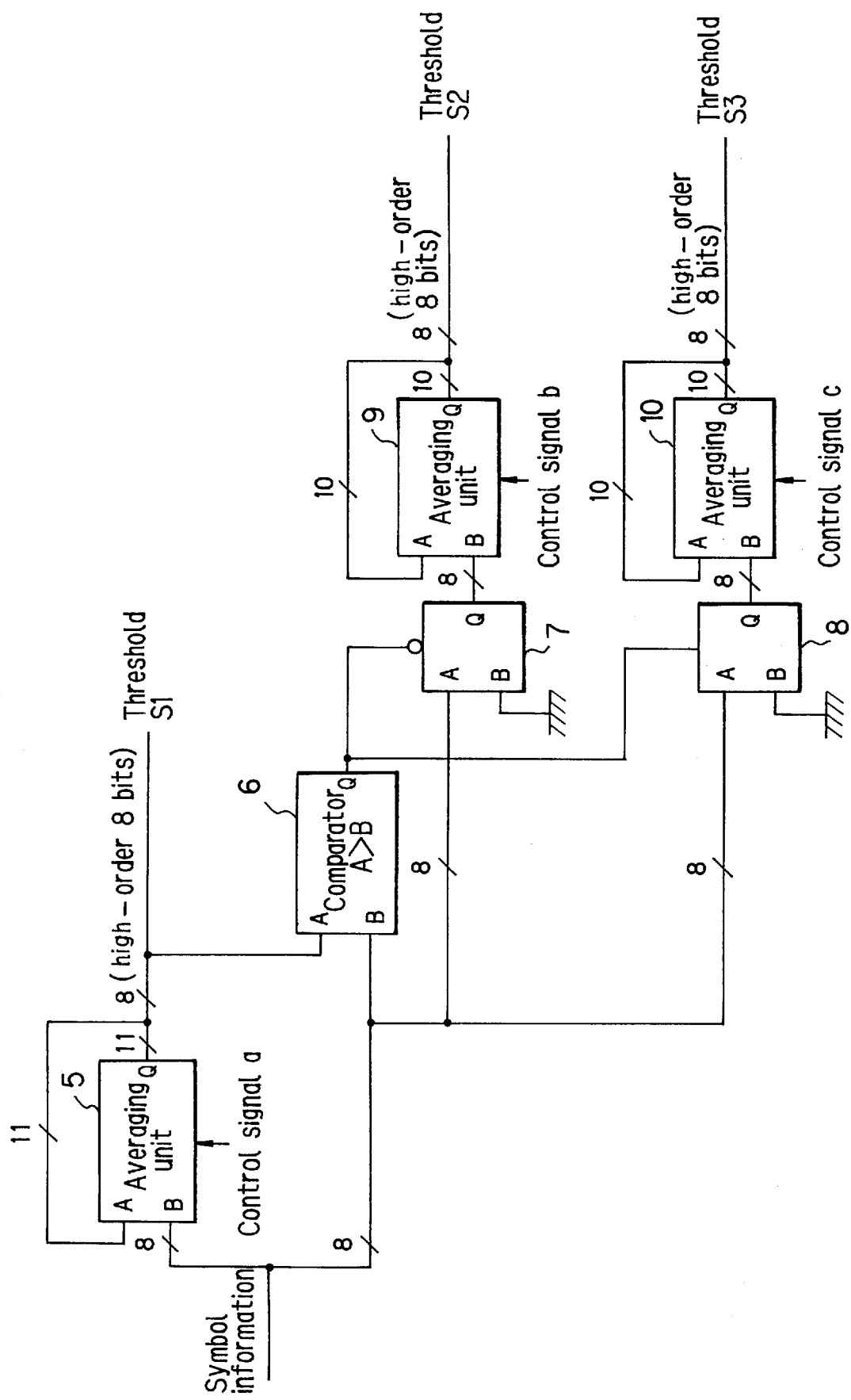
FIG. 2 is a block diagram of the circuit configuration of a threshold generator in FIG. 1.

FIG. 1 shows in the block form the circuit configuration of the embodiment of the present invention. As shown, supplied with a received data comprising the 8-bit data provided by digitizing a received symbol, a symbol information extractor 1 forming one block of this circuit extracts from the received data a symbol information which will be further described later and delivers the extracted symbol information to a threshold generator 2 under the control of a controller 3 which will be further described later. The threshold generator 2 has a circuit configuration as shown in FIG. 2. Receiving control signals $\underline{a}$, $\underline{b}$ and $\underline{c}$ from the controller 3, the threshold generator 2 utilizes the symbol information supplied from the symbol information extractor 1 to sequentially generate three kinds of thresholds (will be referred to as S1, S2 and S3 hereinafter) used to determine values of the received symbols (four kinds: +1, +⅓, −⅓ and −1 as having been described above) and supply the generated thresholds to a symbol determination unit 4. Receiving a control signal $\underline{e}$ from the controller 3, the symbol determination unit 4 is supplied with the received data and thresholds S1, S2 and S3 from the threshold generator 2, uses the thresholds S1, S2 and S3 to determine the value of the received symbol composing the data part of the received data and reproduces the symbol. Supplied with the received data and seeking a synchronization with the transmitted signal, the controller 3 delivers the control signals to the symbol information extractor 1, threshold generator 2 and symbol determination unit 4, respectively, when the synchronization is attained, to control each of these circuits.

FIG. 2 shows the circuit configuration of the threshold generator 2 in FIG. 1. As shown, the threshold generator 2 comprises an averaging unit 5. The averaging unit 5 is operative with the control signal $\underline{a}$ supplied from the controller 3 to receive at an input terminal B thereof a symbol information (8-bit data as mentioned above) from the symbol information extractor 1 via an 8-bit parallel data bus, add the received symbol information and an 11-bit data supplied at an input terminal A thereof via an 11-bit parallel data bus which will be further described later, and deliver the result of the addition (will be an 11-bit data) from an output terminal Q to an 11-bit parallel data bus connected to the output terminal Q. Note that the result of addition (sum) delivered at the output terminal Q of the averaging unit 5 is returned to the input terminal A via the 11-bit parallel data bus and that the high-order 8 bits of the sum represented by the 11 bits are taken out via the 8-bit parallel data bus to provide the first threshold S1.

The threshold generator 2 comprises a comparator 6. The comparator 6 receives at an input terminal A thereof the threshold S1 (the 8-bit data) while receiving the symbol information at an input terminal B thereof to compare these received data and deliver a high-level signal when the threshold S1 supplied at the input terminal A thereof is larger. As shown, the threshold generator 2 also comprises a selector 7. When the signal from the comparator 6 has a low level, that is, when the symbol information is larger than the threshold S1, the selector 7 delivers at an output terminal Q thereof the symbol information supplied to an input terminal A thereof. Otherwise, the selector 7 delivers at the output terminal Q thereof an 8-bit data being a succession of 8 zeros (namely, a data indicative of the potential level at the ground to which the input terminal B thereof is connected). Also a selector 8 is included in the threshold generator 2. When the signal from the comparator 6 has a high level, namely, when the symbol information is smaller than the threshold S1 the selector 8 delivers at an output terminal Q thereof the symbol information supplied to an input terminal A thereof. Otherwise, the selector 8 delivers an 8-bit data being a succession of 8 zeros at the output terminal Q thereof.

In addition to the averaging unit 5, another averaging unit 9 is provided in the threshold generator 2. Receiving the control signal $\underline{b}$ from the controller 3, the selector 9 adds together an 8-bit data supplied to an input terminal B thereof from the selector 7 via an 8-bit parallel data bus, an 8-bit data supplied to an input terminal A thereof via a 10-bit parallel data bus, and a 10-bit data supplied to the input terminal A thereof via a 10-bit parallel data bus, and delivers at an output terminal Q thereof the sum as a 10-bit data which will thus be returned to the input terminal A via the 10-bit parallel data bus. The high-order 8 bits of the 10-bit data from the output terminal Q of the averaging unit 9 are taken out via the 8-bit parallel data bus to provide the second threshold S2. Further, the threshold generator 2 has a third averaging unit 10. Receiving the control signal c from the controller 3, the averaging unit 10 adds together an 8-bit data supplied to an input terminal B thereof from the selector 8 via an 8-bit parallel data bus, and a 10-bit data supplied to the input terminal A thereof via a 10-bit parallel data bus, and delivers at an output terminal Q thereof the sum as a 10-bit data which will thus be returned to the input terminal A via the 10-bit parallel data bus. The high-order 8 bits of the 10-bit data from the output terminal Q of the averaging unit 10 are taken out via the 8-bit parallel data bus to provide the third threshold S3.

Figure 3:
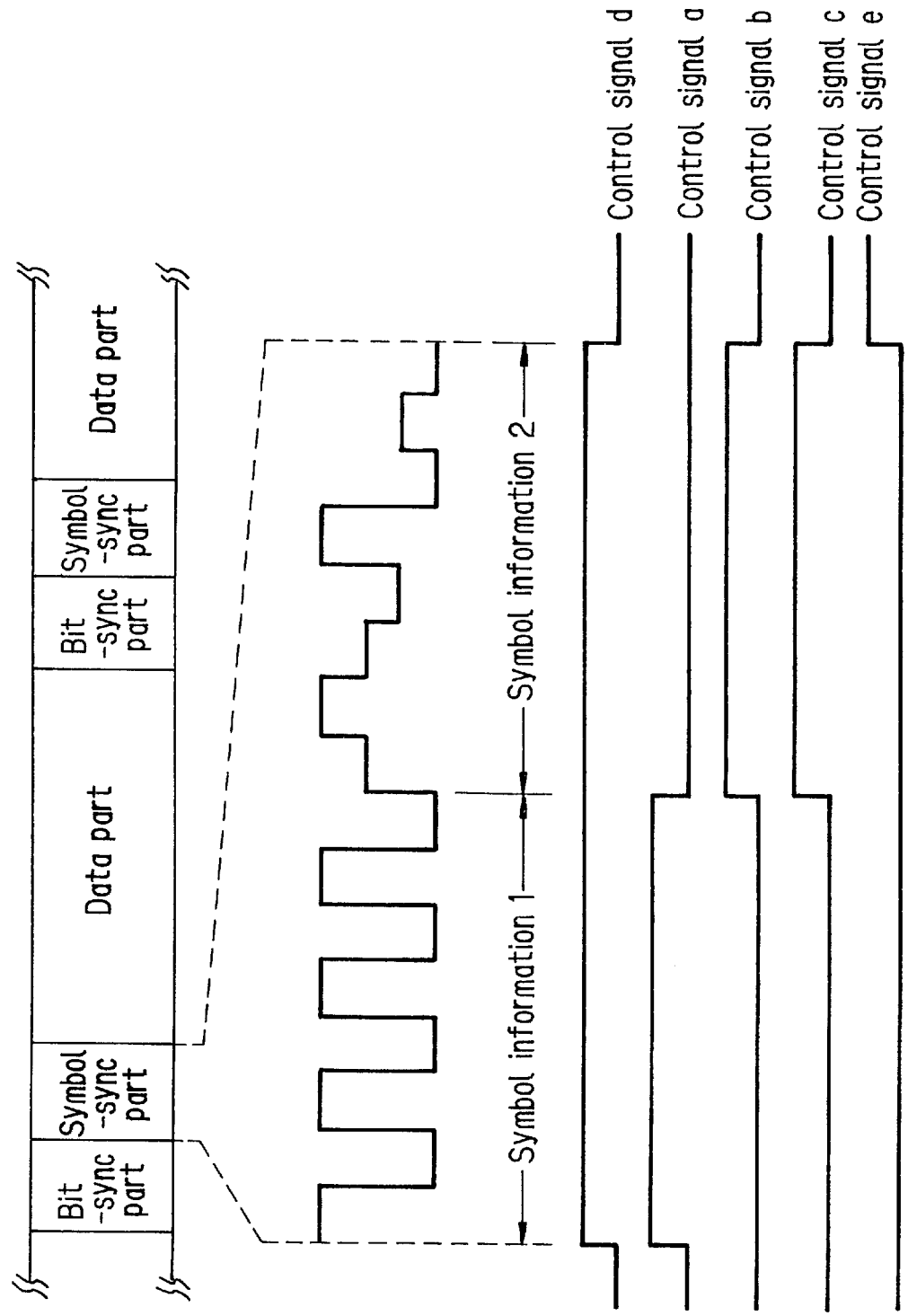
FIG. 3 shows the configuration of a transmitted signal for reception by a receiver in which the embodiment of the present invention is provided.

FIG. 3 shows the configuration of a signal transmitted over a digital radio communications system using therein a receiver in which the embodiment of the present invention is to be provided. As shown, one frame of the transmitted signal consists of a bit-sync part carrying an information on which one of a plurality of predetermined bit rates is used for signal transmission, a symbol-sync part carrying a symbol information used for synchronization between each transmitted signal and the receiver, and a data part carrying an address designating a destination, transmitted information, etc. The symbol information in the symbol-sync part is predetermined to include a symbol information 1 having a succession of 8 alternate symbols having values +1 and −1, respectively, and a symbol information 2 in which each of symbols having values +1, +⅓, −⅓ and −1, respectively, appears 2 times.

The aforementioned embodiment of the symbol determination apparatus according to the present invention functions as will be described herebelow:

The controller 3 in FIG. 1 is supplied with a received data and is synchronized with a transmitted signal by the bit-sync part of the transmitted signal to supply the symbol information extractor 1 with a control signal d̲ for timing the transmission of the symbol-sync part shown in FIG. 3. Receiving the control signal d̲, the symbol information extractor 1 extracts the symbol information 1 and 2 from the received data and delivers them to the threshold generator 2. Thereafter, the controller 3 synchronized with the transmitted signal predicts when the symbol information 1 and 2 transmitted at a predetermined time are received and sequentially delivers control signals a̲, b̲ and c̲ to the threshold generator 2. More specifically, the control signal a̲ is delivered to the first averaging unit 5 at the time of delivery of the symbol information 1 of the symbol-sync part of the received data. Thereafter, at the time of arrival of the symbol information 2 (when the symbol information 1 ends and the symbol information 2 starts), the arrival of the control signal a̲ is stopped and instead the control signal b̲ is delivered to the second averaging unit 9 and the control signal c̲ is delivered to the third averaging unit 10.

Figure 4A:
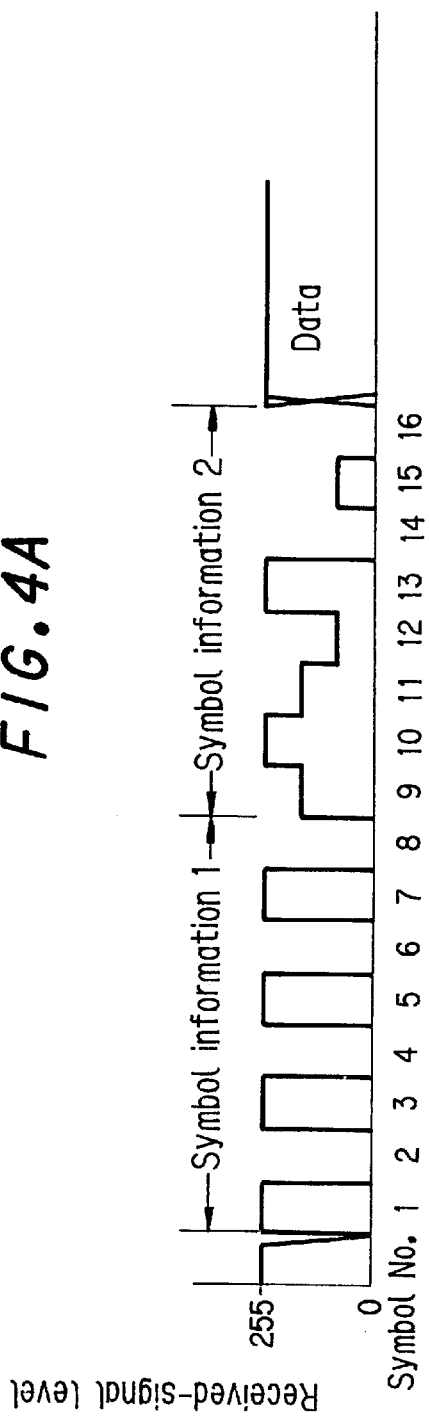
FIG. 4A is a schematic drawing of numbered information of a received symbol.
Figure 4B:
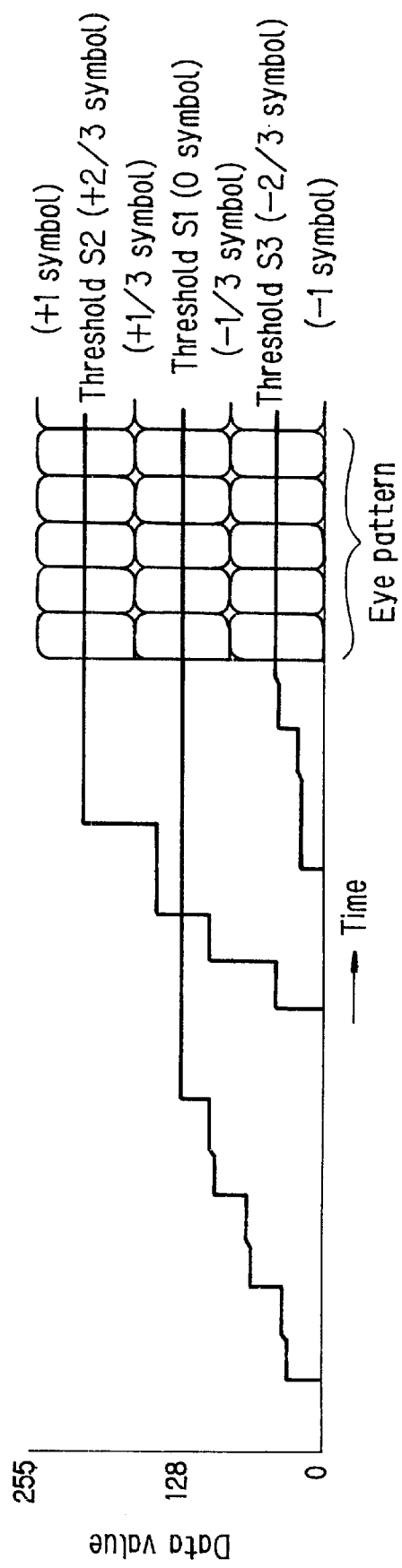
FIG. 4B is a functional time chart of the generation of thresholds for received symbol information shown in FIG. A.

Given the above control signals, the threshold generator 2 receives the symbol information from the symbol information extractor 1 sequentially. Then the threshold generator 2 functions as will be explained below with reference to FIG. 2 showing the circuit configuration of the threshold generator 2, FIG. 4B showing the functional time chart of the threshold generating process, and FIG. 5 showing the threshold generation process by using binary numbers.

In this threshold generator 2, the thresholds are generated by processing binary numbers. FIG. 4B is a graph formed through conversion of binary numbers to decimal numbers for easy understanding of the process of threshold generation. As shown in FIG. 4A, each symbol in the symbol information is numbered for the convenience of the explanation. For example, the first symbol in the symbol information 1 will be called a symbol No. 1 and the second symbol in the symbol information 2 be called a symbol No. 10 in the following description.

First, just before the symbol No. 1 is supplied to the threshold generator 2, the control signal a is delivered from the controller 3 to the threshold generator 2 in which the averaging unit 5 in FIG. 2 will be activated. Thereafter, the threshold generator 2 is supplied with the symbol No. 1 which will be supplied simultaneously to the input terminal B of the averaging unit 5, input terminal B of the comparator 6, input terminal A of the selector 7 and input terminal A of the selector 8.

In the averaging unit 5 thus activated, an 8-bit binary number 11111111 being the symbol of the symbol No. 1 supplied to the input terminal B and an 11-bit binary number 00000000000 supplied to the input terminal A, are added together as shown in FIG. 5. An 11-bit binary number 00011111111 being the result of the addition (sum) is delivered at the output terminal Q. An 8-bit binary number 00011111 being the high-order 8 bits of the 11-bit binary number is delivered as the threshold S1 and the 11-bit binary number delivered at the output terminal Q is returned to the input terminal A for the processing of the symbol No. 2.

When supplied at the input terminal B with an 8-bit binary number 00000000 being the symbol for the symbol No. 2, the averaging unit 5 adds together the delivered 8-bit binary number and the 11-bit binary number 00011111111 having been returned to the input terminal A. An 11-bit binary number 00011111111 being the sum thus obtained is delivered at the output terminal Q. An 8-bit binary number 00011111 being the high-order 8 bits of the 11-bit binary number is delivered as the threshold S1, and the 11-bit binary number is returned to the input terminal A for the next processing.

Thus, each of symbol Nos. 3, 4, 5, 6, 7 and 8 supplied to the averaging unit 5 is processed in a similar manner. Each time a symbol having the value +1 is supplied, the threshold S1 takes a larger value as shown in FIG. 4. Finally, the threshold S1 is a mean value (corresponding to a symbol value 0) for the 8-bit binary numbers 01111111, that is, the symbol Nos. 1 to 8.

In FIG. 5, all the symbols having the value 1 (namely, the symbol Nos. 1, 3, 5, ) are 11111111, but all the symbols having the value −1 (that is, the symbol Nos. 2, 4, 6, . . . ) are not 00000000. In some of the even-numbered symbols, the low-order digits are found changed, which means that no ideal state of transmission is available for transmission of such symbols and the received symbols deviate from those transmitted over the idea transmission line (the present invention will be most effective for signal transmission over such a transmission line).

When the above-mentioned symbol Nos. 1 to 8 are supplied to the threshold generator 2, the comparator 6 shown in FIG. 2 delivers a high-level signal and a low-level signal alternately (when the symbol Nos. 1, 3, 5 and 7 are supplied to the input terminal B of the comparator, the low-level signal is delivered, but when the symbol Nos. 2, 4, 6 and 8 are supplied, the high-level signal is delivered). The selectors 7 and 8 deliver symbols supplied to the input terminals A thereof, respectively, alternately at the output terminals Q thereof, respectively, to the input terminal B of the averaging unit 9 or 10. At this time, however, the averaging unit 9 or 10 has not yet been supplied with the control signals b and c, and so it does not work and the thresholds S2 and S3 are fixed to 00000000 (see FIGS. 4B and 5).

As in the above, the symbol Nos. 1 to 8 are transmitted. The threshold S1 is the mean value of these symbols. It is an 8-bit binary number 01111111 corresponding to the symbol value 0. Thereafter, the control signal a will not be supplied any longer, the averaging unit 5 stops operating, the control signals b and c will be supplied instead, and the averaging units 9 and 10 will be activated. When a symbol 10101001 (see FIG. 5) for a next symbol No. 9 arrives, the comparator 6 compares the symbol 10101001 for the symbol No. 9 supplied to the input terminal B thereof with the above threshold S1 supplied to the input terminal A thereof, namely, 01111111. It detects that the former is larger than the latter, and delivers a low-level signal. The symbol 10101001 for the symbol No. 9 in consideration is supplied to the input terminal B of the averaging unit 9 via the selector 7.

The averaging unit 9 adds together a symbol 10101001 supplied to the input terminal B thereof and a 10-bit binary number 0000000000 supplied to the input terminal A, and delivers at the output terminal Q thereof the sum, namely, a 10-bit binary number 0010101001. The high-order 8 bits 00101010 of the 10-bit binary number are delivered as the threshold S2, and the 10-bit binary number is returned to the input terminal A for a next processing. In this way, symbol Nos. 10 and 11 larger than the threshold S1, when supplied, will be processed in a generally same manner. In the course of such a processing, the selector 8 delivers at the output terminal Q thereof an 8-bit binary number 00000000 supplied to the input terminal B thereof, so that the averaging unit 10 delivers a 10-bit binary number 0000000000, and the 8-bit binary number 00000000 is taken as the threshold S2 (see FIGS. 4B and 5).

When the 8-bit binary number 01010011 being the symbol for the symbol No. 12 arrives after the above operation, the comparator 6 delivers a high-level signal because the 8-bit binary signal is smaller than the threshold S1. The 8-bit binary number is supplied through the selector 8 to the averaging unit 10 where it will be added to another symbol. The high-order 8 bits of the sum, the result of the addition in the averaging unit 10, are delivered as the threshold S3 (See FIG. 5). Note that at this time, the averaging unit 9 is supplied from the selector 7 with the 8-bit binary number 00000000 having been supplied to the input terminal B of the selector 7 and the threshold S2 will not vary (see FIGS. 4B and 5).

Next, when the 8-bit binary number 11111100 being the symbol for the symbol No. 13 arrives, it is added to another symbol in the averaging unit 9 similarly to the symbol Nos. 9 to 11 because it is larger than the threshold S1. Thus, the threshold S2 is updated. The threshold S2 is a mean value of the symbol Nos. 9 to 11 and 13, corresponding to the symbol value $+\frac{2}{3}$.

When a symbol for each of symbol Nos. 14 to 16 arrives, it is processed in a generally same manner as the symbol No. 12 because it is smaller than the threshold S1 (see FIGS. 4B and 5). Finally, the threshold S3 is a mean value for the symbol Nos. 12 and 14 to 16, corresponding to the symbol value $\frac{2}{3}$.

The aforementioned operations provide the thresholds S1, S2 and S3 corresponding to the symbol values 0, $+\frac{2}{3}$ and $-\frac{2}{3}$. The thresholds S1 to S3 are supplied to the symbol determination unit 4 from the threshold generator 2. The symbol determination unit 4 is operative with a control signal e supplied from the controller 3 at the time when the data part of the received data is received, to determine the symbol of the data part based on the supplied thresholds S1 to S3.

As having been described in the foregoing, thresholds for determination of received symbols are sequentially generated based on the level of a symbol information by taking it in account that the level of a symbol information in a symbol-sync part transmitted for the purpose of synchronizing a receiver of a digital radio communications system reflects the state of the concurrent transmission. When the level of a received symbol is caused to fall due to a degradation, etc. of the transmission line, the threshold varies following up with the symbol-level falling. Therefore, any trouble such as narrowing of noise margin, etc. does not take place as in case the threshold is fixed. Thus, the quality of reception can be maintained.

What is claimed is:

1. A symbol determining method destined for use in a receiver of digital radio communications system in which a frame of a transmitted signal has, besides a data part carrying a to-be-transmitted information, a symbol-sync part carrying a symbol information used for phase-matching between the transmitted signal and the receiver, comprising the steps of:

receiving the symbol information extracted from a symbol-sync part of a received signal obtained by demodulating a received wave and digitizing it;

generating thresholds, based on a reception level of the symbol information, for use to determine the value of a received symbol; and determining the value of the received symbol in the data part of the received data based on the thresholds.

2. A symbol determination apparatus destined for use in a receiver of a digital radio communications system in which a frame of a transmitted signal has, besides a data part carrying a to-be-transmitted information, a symbol-sync part carrying a symbol information used for phase-matching between the transmitted signal and the receiver, comprising:

symbol information extracting means for extracting a symbol information of the symbol-sync part from a received data obtained through demodulation and digitizing of the received wave, and delivering the extracted symbol information;

threshold generating means for receiving the symbol information delivered from the symbol information extracting means, generating thresholds, based on a reception level of the symbol information, for use to determine the value of a received symbol, and delivering the thresholds thus generated;

symbol determining means for receiving the received data and the thresholds from the threshold generating means, determining the value of the received symbol in the data part of the received data, and reproducing the symbol; and controlling means for receiving the received data, delivering, based on the received data, an activation timing control signal to each of the symbol information extracting means, threshold generating means and symbol determining means.

3. The symbol determination apparatus as set forth in claim 2, wherein said threshold generating means comprises:

a first averaging unit which is activated with a first control signal supplied from the controlling means to add together an input symbol information and data returned from an output terminal thereof via a data bus and provide a first threshold;

a second averaging unit which is activated when the first control signal is not supplied any longer and when supplied with a second control signal from the controlling means, to compare the input symbol information with the first threshold, add together the input symbol information and data returned from an output terminal thereof via a data bus when the symbol information is larger, and provide a second threshold; and a third averaging unit which is activated with a third control signal supplied from the controlling means at the same time the second control signal is supplied from the controlling means to the second averaging unit to compare the input symbol information with the first threshold, add together the input symbol information and data returned from an output terminal thereof via a data bus when the symbol information is smaller, and provide a third threshold.

* * * * *